Oct. 20, 1964 C. P. YODER ETAL 3,153,447
OIL COOLING HEAT EXCHANGE UNIT
Filed Sept. 11, 1963 6 Sheets-Sheet 3

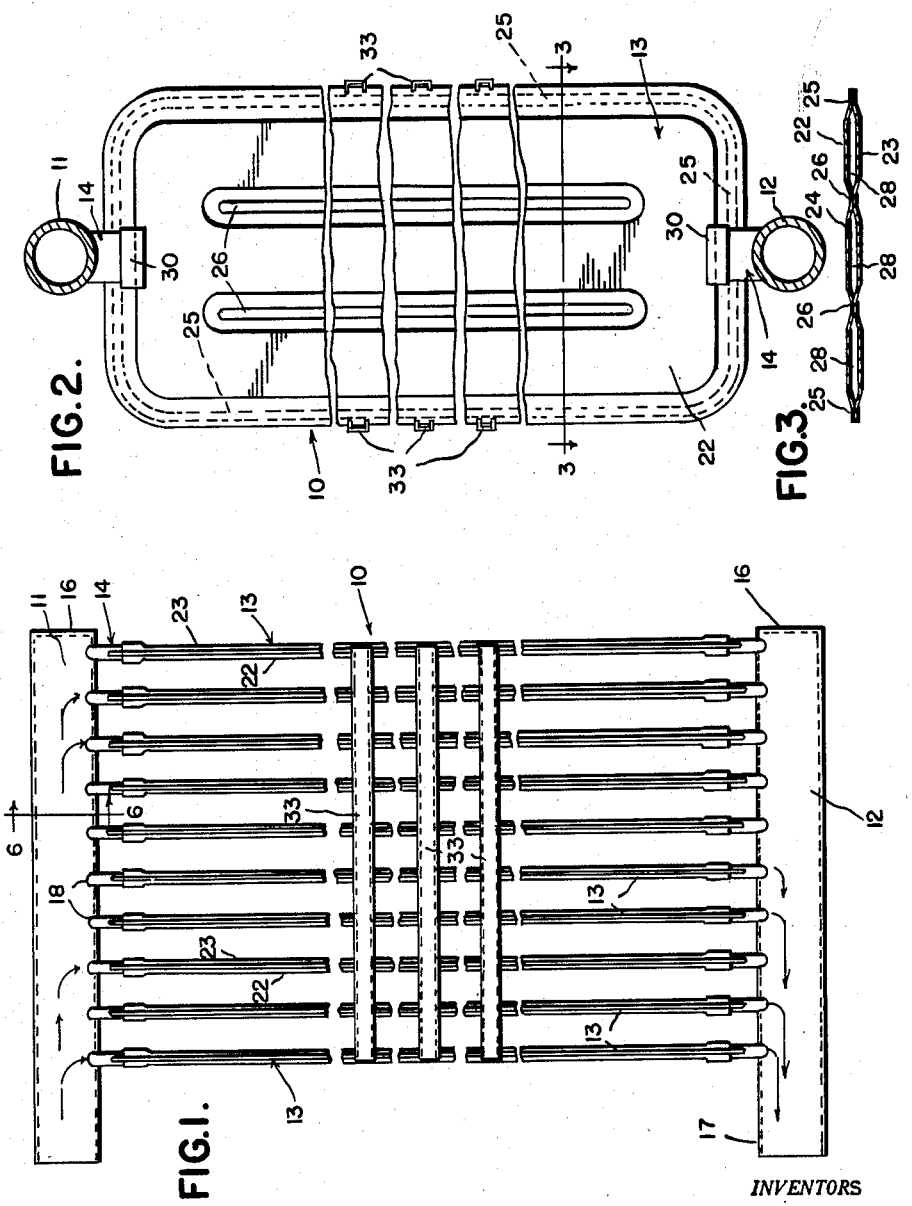

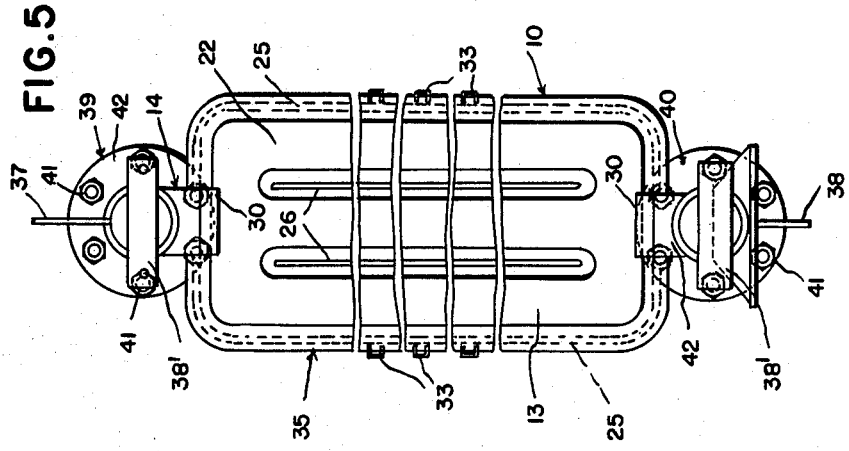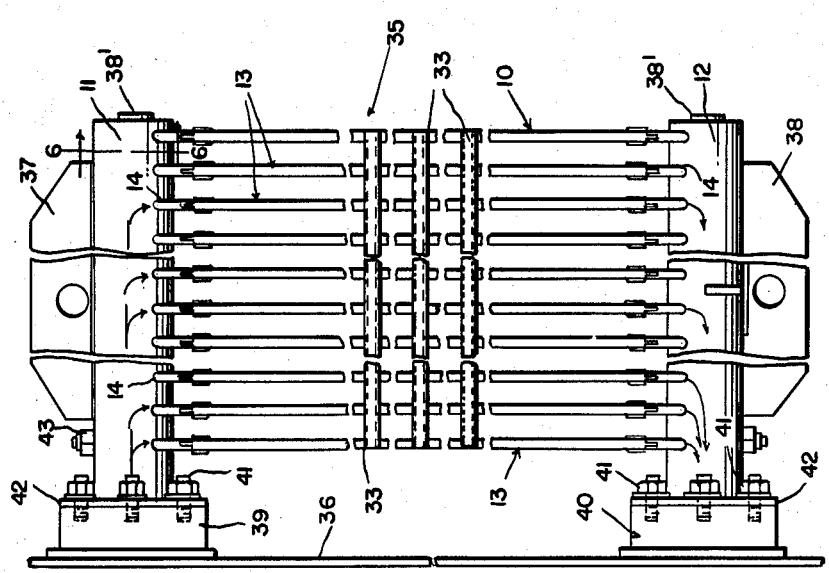

INVENTORS
CLAYTON P. YODER
BY KENNETH L. KALTZ
ATTORNEYS

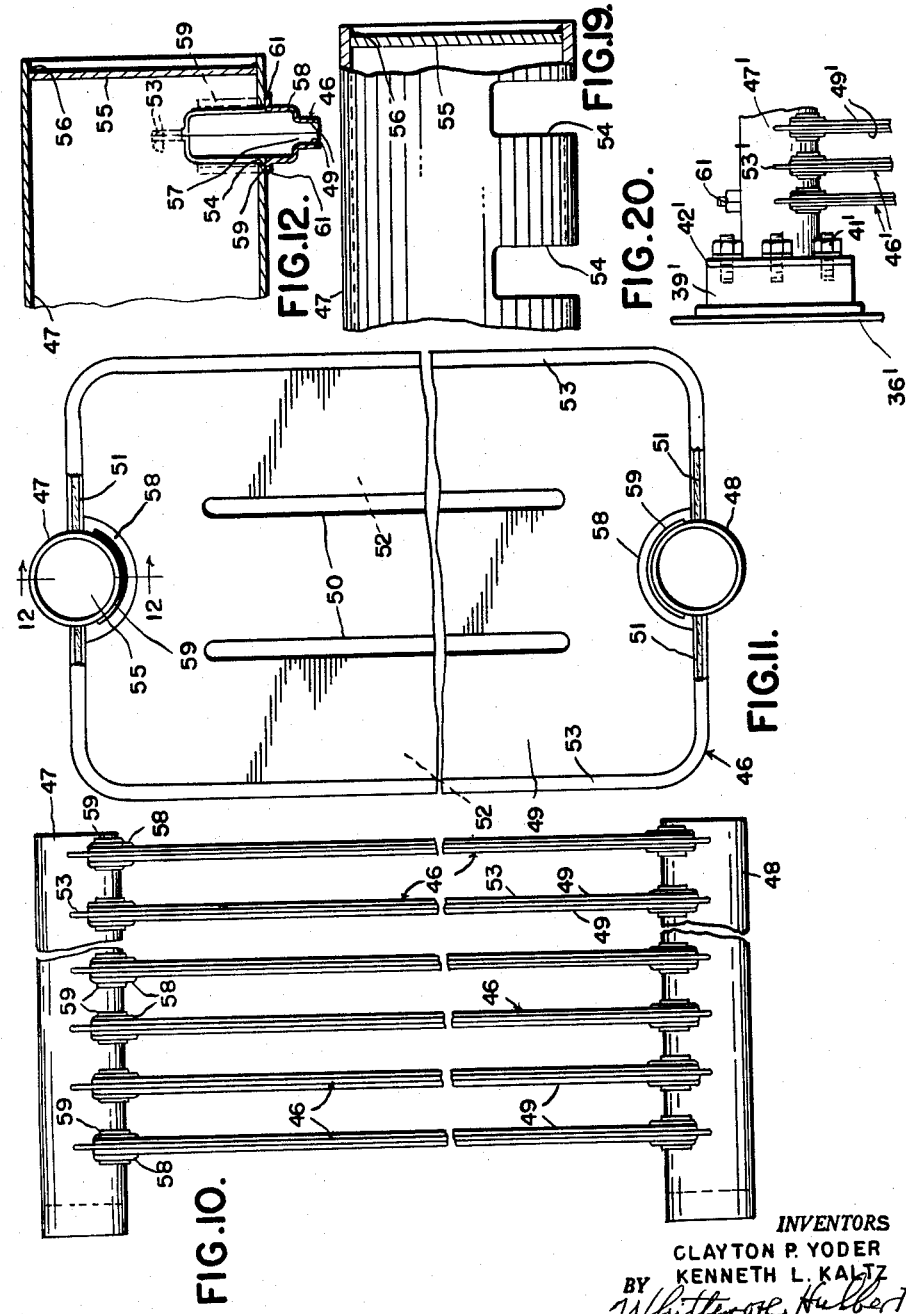

Oct. 20, 1964 C. P. YODER ETAL 3,153,447
OIL COOLING HEAT EXCHANGE UNIT
Filed Sept. 11, 1963 6 Sheets-Sheet 5
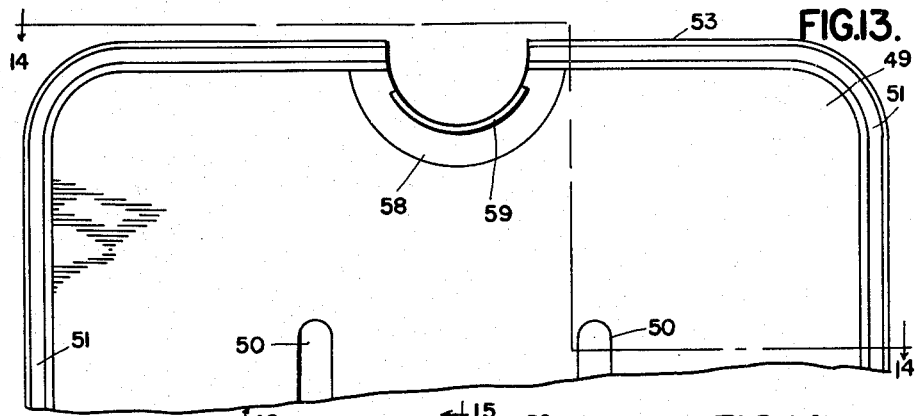
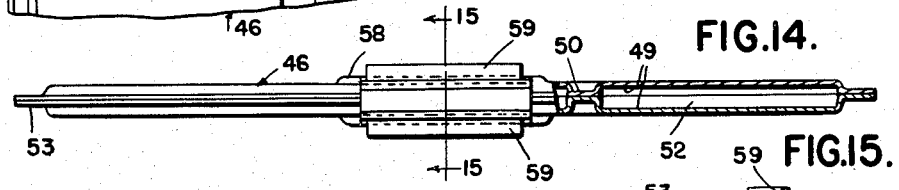
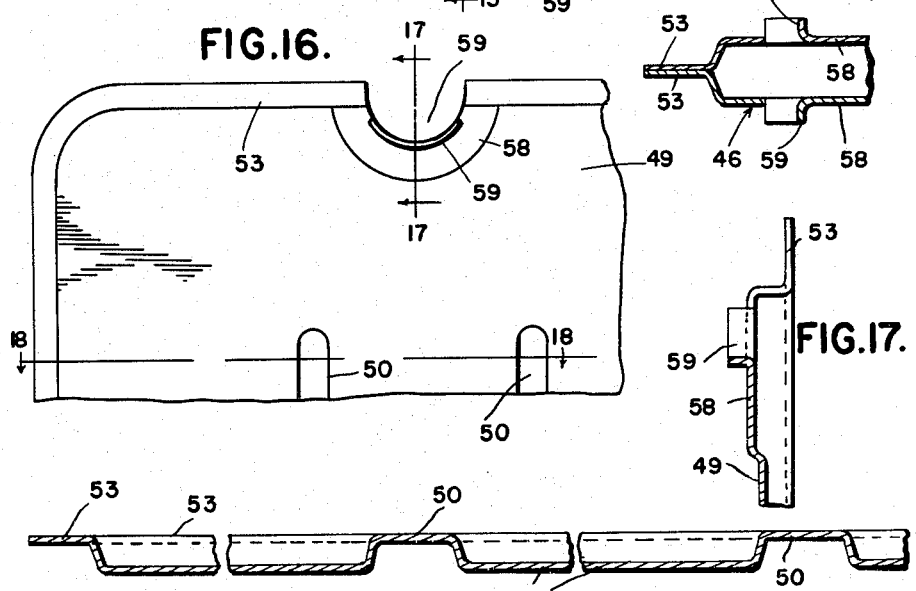
INVENTORS
CLAYTON P. YODER
KENNETH L. KALTZ
BY
ATTORNEYS

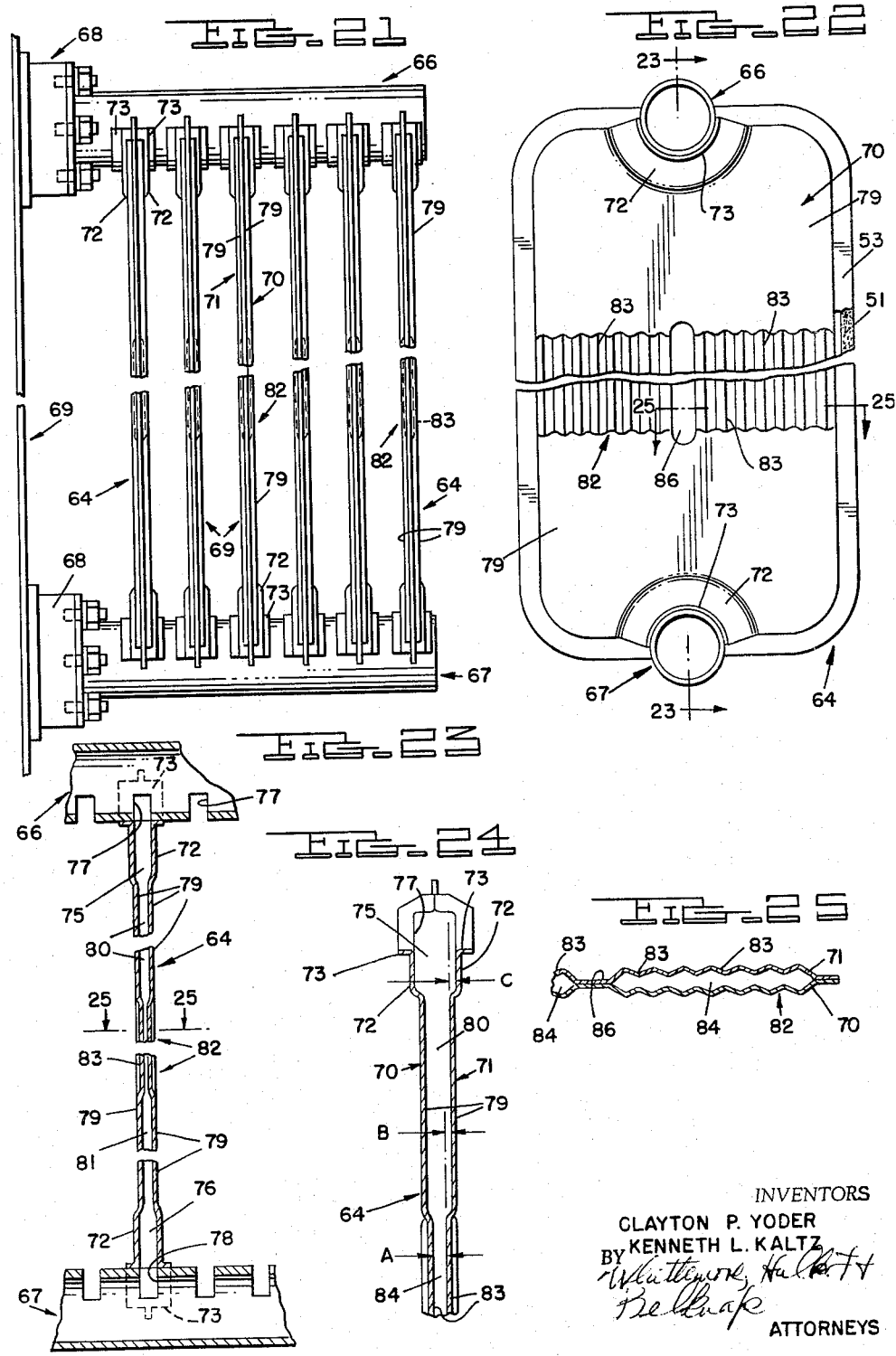

United States Patent Office 3,153,447
Patented Oct. 20, 1964

3,153,447
OIL COOLING HEAT EXCHANGE UNIT
Clayton P. Yoder, Nazareth, Pa., and Kenneth L. Kaltz, Lansing, Mich., assignors to Tranter Manufacturing, Inc., Lansing, Mich., a corporation of Michigan
Filed Sept. 11, 1963, Ser. No. 308,252
2 Claims. (Cl. 165—170)

The present invention relates to an improved heat exchange unit for the cooling of the heat transfer oil of an electrical transformer or other device employing a circulating liquid coolant; and the invention also deals with the methods of making such heat transfer units. More particularly, the invention relates to a radiator or cooler unit which is fabricated in the main of specially stamped seam-welded sheet metal plate members or assemblies associated in a novel manner with supply and return header pipes.

The present application is a continuation-in-part of our copending application, Serial No. 137,294, filed September 11, 1961.

In one embodiment of the invention, the connection of the assembled plates to the headers is effected through the agency of special transition pieces, all of these components being welded together in a unitary structure.

In other and preferred embodiments, the plates are specially stamped to afford widened mouth portions having arcuate flanges projecting therefrom at which the plate assembly is welded to the header about relatively wide and large arcuate slots in the latter, thus providing an enlarged collar of strength at the weldment to mount the plate assembly to the header in a very strong and stable manner.

What is equally or more important, the enlargement of the entry mouths from header to plate assembly at the enlarged slots of the former give an ample intake of oil to the latter and a decreased resistance to flow therein, both tending to increase circulatory efficiency.

In the most preferred embodiment, this enlarging or flaring of the plate assembly is, for even better heat dissipation efficiency, carried even further into the interior of the latter in the form of a slight step-down from maximum width at the header mouths to a still substantially wide manifold throat zone of quite large area inwardly of the mouth. Furthermore, a combination of the last mentioned, large manifold throat feature with a further rippling or corrugating of the plates of the assembly inwardly of the wide throat zone has been found to produce results in terms of heat transfer efficiency far superior to the expectable sum of efficiencies of the component structural features, namely, enlarged header intake width, enlarged throat or manifold stepping and rippling or corrugating.

The supply and return headers of such heat transfer units are, for desired rigidity and flow capacity, constructed of a suitable diameter of pipe stock of adequate wall thickness or gauge, while the sheet metal plate assemblies are, on the other hand, or considerably less thickness of wall. This introduces a problem in making the welded connection of the plate assemblies to the header, not only in providing efficient, leak-tight weldments of adequate strength for the purpose, but also of withstanding vibratory and shock stresses, as in shipment or handling.

Therefore, it is a general object of the invention to provide a plate-type heat exchange unit of the sort described, in which improved provisions of one sort or another are made to secure the desired type of welded connections between the headers of one wall thickness and plate members or assemblies of a considerably lesser wall thickness.

Thus, in accordance with the above first-mentioned embodiment employing special transition pieces, the latter are fabricated of tubular metal of a wall thickness intermediate that of the header material and the plate material, so that the weldments as between the header and the transition pieces, on the one hand, and between the transition piece and plate assembly, on the other hand, are more compatible, more efficient and more readily made than if the plate assemblies were welded direct to and between the headers. There at the same time results a vibration and shock cushioning action through the successive or progressive weldments to protect the heat transfer unit as a whole against damage.

In second and third embodiments of the invention referred to above, the same result is attained in a different fashion, in that the welded plates of the plate assemblies are provided with integral and relatively widely spaced mouth embossments surrounding the zone at which the assemblies have communication with the respective headers at relatively wide arcuate slots in the latter; and are in addition provided at these embossments with integral, laterally outwardly projecting flanges of arcuate shape, in which flanges the headers nest as applied to the plate assemblies. This enables the welded connection between plate assembly and headers to be effected in a facilitated and more efficient manner than heretofore possible. The rigidifying and collar-of-strength effect of the plate embossments and the flanging feature also has the result of dampening vibrational strain on weldments and permitting a more efficient welding technique, as in the case of the use of transition pieces. In all forms the possibility of weld fatigue is eliminated.

Generally, and also in accordance with both forms, it is an object to the invention to provide a plate type heat transfer unit which, for a given surface heat transfer capacity, is extremely compact in size, as well as light in weight, but which, due to its assembly of a plurality of individually thin, plate-like heat transfer members of relatively great individual plate area in a series between supply and return headers of considerable liquid handling capacity, has ample cross section area of liquid flow passageway through the plate members to avoid restricting the flow of heat transfer liquid in the headers.

Yet it has been found that an increasing of the intake and exit manifold volumes in the throat of the plate assembly directly adjoining the header mouths, as in the preferred embodiment, coupled with a rippling of the plates between these mouth and throat manifold zones, will produce a high heat dissipative efficiency, due to a bettered oil flow characteristic, which cannot be explained simply in terms of increased heat transfer surface.

In any of the embodiments of the invention, a very thin oil film at the inner surface of the plates gives a maximum ratio of exposed surface to oil volume passing therethrough. The area-volume ratio is high, signifying that maximum heat is transferred with a minimum volume of oil, and this is another factor reducing the weight of the unit as a whole considerably.

It follows that, from higher overall "U" value and increased capacity for heat transfer between the oil and the cooling air sweeping the external surfaces of the unit, the heat transfer members may be stacked as closely together in the transverse sense as is consistent with convective transfer efficiency, resulting in a smaller, more compact and lightweight installation as a whole. With a plurality of the plate members assembled in relatively closely stacked relation, and disposed vertically and parallel to one another, a very desirable stack effect is achieved. That is, as cool air enters the unit at its bottom, and between the transversely stacked plates, it is heated and expanded in progressing from the bottom to the top.

Being restricted to a small width of flow space, the velocity of the air is increased, which has the effect of reducing the air film next to the plates, which in turn increases the rate of heat transfer. Being cooled more rapidly and efficiently in this process, the oil flowing in the passages between the plates of the heat transfer member flows much faster than it normally would; and this effect continues until an equilibrium is reached, at which a very high heat transfer efficiency characterizes the continuing operation.

The invention contemplates the production of units for either permanent installation to a transformer or the like, or for detachable use, and in this connection, due to the simplified construction described above, different interchangeable sizes of unit enable the same to be offered for different requirements as to compactness, heat transfer capacity, etc. Horizontal surfaces of the units are contoured to prevent entrapment of surface moisture, and thus reduce the number of possible zones of corrosion; and the edges of the plate are sealed to similarly prevent entrapment or accumulation of moisture. Furthermore, due to a basically flat character of their vertically disposed surfaces, the members in question are well adapted to the addition of fins or like extension surfaces so as to further increase the effective heat transfer area, where needed.

The foregoing as well as other objects will become more apparent as this description proceeds, especially when considered in connection with the accompanying drawings illustrating the invention, wherein:

FIG. 1 is a view in side elevation, partially broken away, illustrating the improved cooler or radiator unit of the invention in accordance with an embodiment employing transition pieces, being shown in an adaptation designed for permanent application to a transformer or like apparatus to be serviced;

FIG. 2 is a view, also partially broken away, of the unit of FIG. 1 in end elevation;

FIG. 3 is a view in horizontal cross section along line 3—3 of FIG. 2;

FIG. 4 illustrates, in side elevation and as partially broken away, a unit in accordance with an alternative embodiment of the first form, in this case having provisions for its removable attachment to the apparatus to be serviced;

FIG. 5 is a partially broken away view in end elevation of the unit of FIG. 4;

FIG. 10 is a view in side elevation, partially broken away and generally similar to FIG. 1, illustrating a second alternative embodiment of the invention, wherein a different type of welding provision is employed to secure plate assemblies to the headers at enlarged and flanged mouths of the plates, this form also contemplating a permanent welded or like connection of the heat exchange unit to a transformer or the like to be serviced;

FIG. 11 is a partially broken away view in end elevation of the unit of FIG. 10, as from the right of that figure;

FIG. 12 is a fragmentary enlarged scale view in transverse vertical section along a line corresponding to line 12—12 of FIG. 11;

FIG. 13 is a fragmentary end elevational view of a component welded plate member of this embodiment;

FIG. 14 is a top plan view of the assembly of FIG. 13, being partially broken away and in horizontal section on line 14—14 of FIG. 13;

FIG. 15 is a view in transverse section along line 15—15 of FIG. 14, showing the improved manner of throat or mouth embossing and flanging the plate assembly for welded connection to a header, as in FIGS. 10–12;

FIG. 16 is a fragmentary view in end elevation of one of two like plates which, when welded flatwise to one another, produce the plate assembly of FIGS. 13–15;

FIGS. 17 and 18 are, respectively, fragmentary views in vertical and horizontal section along lines 17—17 and 18—18 of FIG. 16;

FIG. 19 is a fragmentary elevational view showing one of the supply and return pipe headers of the unit, prior to assembly with welded transfer plate members, being partially broken away and in axial section;

FIG. 20 is a fragmentary view in section similar to FIG. 4 showing the invention in accordance with the embodiment of FIGS. 10 through 19, but in an adaptation for detachable connection with the transformer or like unit to be serviced;

FIG. 21 is a side elevational view, partially broken away, of a still further and preferred embodiment of the invention, featuring, for optimum heat dissipation capacity, enlarged mouth and throat manifolding of the welded plate assembly at opposite sides of a central, vertically rippled or corrugated zone;

FIG. 22 is an end elevation of the unit of FIG. 21;

FIG. 23 is a fragmentary view in horizontal section on line 23—23 of FIG. 22;

FIG. 24 is an enlarged scale fragmentary view showing the successive weld flange, entry mouth, manifold throat and rippled features of a plate assembly according to this preferred embodiment, being in section similar to FIG. 23; and FIG. 25 is a fragmentary view in horizontal section on line 25—25 of FIGS. 21 and 22.

Figure 6:
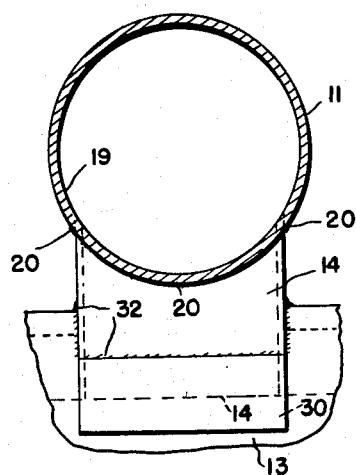
FIG. 6 is a fragmentary view in enlarged scale and in transverse vertical section along a line corresponding to line 6—6 of FIG. 1 or 4.
Figure 7:
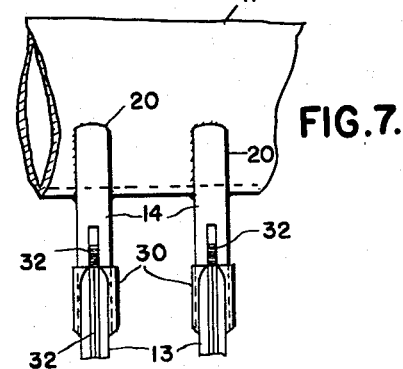
FIG. 7 is a fragmentary view in enlarged scale and side elevation of the structure of FIG. 6.

Referring first to FIGS. 1, 2 and 3 of the drawings, in conjunction with FIGS. 6 and 7, there is illustrated therein one embodiment of the invention as devised for permanent application to a transformer or like unit to be serviced by heat dissipative transfer of its circulating heat transfer medium. The unit of FIGS. 1, 2 and 3 is generally designated by the reference numeral 10 and is made up of three essential types of component. These are the upper and lower liquid supply and return conduits or headers 11, 12, respectively, the direction of liquid flow therein being indicated by arrows; the welded plate-type heat transfer members or assemblies 13, structural features of which will be described; and the tubular transition pieces 14, also to be described in greater detail.

The headers 11, 12 are formed of tubular pipe or stock, of as light weight and wall thickness as is possible consistent with their function of coupling the unit to the apparatus to be serviced; and they may be of lighter material than would normally be employed, on account of the self-rigidifying and vibration absorbing characteristics of the transition structure of the unit.

Headers 11, 12 are closed at one end wall 16 of each, and their opposite open ends 17 are adapted to be welded or otherwise permanently connected by suitable coupling means, such as will suggest itself to those skilled in the art, to discharge and return portions (not shown) of the serviced transformer or other apparatus, for circulation of the heat transfer liquid, usually a suitable grade of oil.

At suitably spaced points along the headers 11, 12, the bottom surface of the former and the upper surface of the latter are milled, punched or otherwise formed to provide slot-like openings, as at 18, to which the transition pieces 14 are fitted, in a flush relationship (as shown in FIGS. 6 and 7) of the inner, arcuately curved, mating ends of the transition pieces 14 to the inner wall surface 19 of the respective headers 11, 12. As so fitted, the headers 11, 12 and the respective transition pieces 14 are arc welded around the periphery of the joint, as indicated at 20. This welded connection will preferably be made after the transition pieces have been assembled to the respective plate heat exchange members 13, which is accomplished in a manner to be described.

The wall thickness of the transition pieces 14 is less than that of the headers, enabling a very good weld to be made at 20 for a strong and rigid structure.

The plate members 13 are identical in character. As indicated in FIG. 3, each is constituted by a pair of like plates 22, 23 of generally flat character, though embossed to provide relatively shallow formations 24. As assembled in the face-to-face relationship of FIG. 3, plates 22, 23 are marginally seam welded about the periphery thereof, as at 25. They are also seam welded to one another along parallel zones extending longitudinally of their vertically elongated rectangular outline, as at 26, the seam weld zones 26 terminating beneath and above, respectively, the horizontal top and bottom portions of the marginal seam welding 25; and the zones 26 being spaced inwardly of the vertical side portions of the marginal welding 25 at a distance approximating the lateral spacing of the weld zones 26 from one another.

There is thus provided a plate heat exchange unit 13 which has vertically extending, parallel liquid flow passages 28 between the peripheral weld zones and the internal parallel zones 26 and between the two zones 26, as illustrated in FIGS. 2 and 3; and it is obviously possible to subdivide the plate member 13 into any desired number of vertical passages, by employing an indicated number and spacing of the weld zones 26, as called for by the requirements or limitations of the particular installation. It is also to be seen that the plate member 13 is provided with internal horizontal or transverse top and bottom manifolds above and below the weld zones 26, for a common communication of the passages 28 with transition pieces 14 at the top and bottom header connections of unit 10.

The plates 22, 23 of the member 13 are selected of a gauge or thickness less than that of the transition pieces, for a better weld connection to the latter in the manner to be described, and for enhancing the cushioning and shock absorbing action contemplated by the choice of diminishingly thick components in the order from header to plate member 13. Though the seam welding 25 is indicated for distinctness in FIG. 2 (in dotted line) in the form of a strip spaced inwardly from the outer periphery of the member 13, it is preferred that the plates be weld-sealed up to their extreme edges and the edges beaded or rolled, thereby eliminating a zone of possible moisture entrapment and resultant corrosion. This objective is also contributed to by the generally flat outline of the plate member 13 as a whole (FIG. 3). As indicated above, the flat surfaces of the plates 22, 23 lend themselves to the application of additional finned or projecting heat transfer surfaces, if additional effective heat transfer surface is needed or desired.

Referring again to FIGS. 6 and 7 in conjunction with FIGS. 1–3, it is seen that the plate members 13 are provided at the top and bottom thereof, and midway between their vertical sides, with an outwardly flared throat formation 30 providing top and bottom vertical openings from the interior of the member to its exterior, for the intake and outlet, respectively, of the circulating oil or other heat transfer liquid. The formations 30 are, like the plates 22, 23 in which they are formed, flat-sided, and terminate within the horizontal top and bottom margins of the plate member, the latter being cut away at its edges through the seam weld 25 to receive the transition piece 14.

Transition pieces 14 are, as shown in FIGS. 6 and 7, also of flattened tubular construction. They are of sufficient vertical length to fit well within the cuts of the plate member 13 which receive the same, as indicated in dotted line in FIG. 6, for a strong and braced connection. As thus interfitted, the transition pieces 14 are connected in sealed relation to the plate heat transfer members 13, preferably by gas welding at 32 around the periphery of the joint. Thus assembled to the member 13, the transition pieces 14 are mated and welded to the upper and lower headers 11, 12 in the manner described above to provide mouths of substantial width opening through correspondingly wide slots of the headers.

If additional rigidity is desired, it may be had by welding suitable transverse parallel braces 33 (FIGS. 1 and 2) of channel-like cross section across the opposite vertical edges of the assembly. Thus constituted, the unit 10 is ready to be permanently applied to the transformer.

An alternative adaptation of the first embodiment of the invention is illustrated in FIG. 4 and FIG. 5, being generally designated by the reference numeral 35, and having provisions for its detachable connection to the transformer or like apparatus to be serviced, which may be considered to be represented by the schematically indicated part 36. Such detachability is desirable for the shipping of large size transformers without their external radiator structure mounted thereon. As shown in these FIGS. 4 and 5, the unit composed of top and bottom headers, transition pieces and plate heat exchange members is in all main respects identical to that shown in FIGS. 1–3, 6 and 7; accordingly, corresponding reference numerals are employed to designate corresponding relationships, and as to these components further description will be dispensed with.

It may be noted that in the embodiment of FIGS. 4 and 5 the top and bottom headers 11 are equipped with flange or rib plates 37, 38, respectively, welded along the respective top and bottom surfaces thereof in a plane including the axes of the headers. These are for the purpose of stiffening the headers. The outer end of each of the headers 11, 12 is closed by an end cap or plug, to which a tie strap 38' is welded to facilitate tying two or more of the units or assemblies 10 in side-to-side relation to one another.

At their respective open or left-hand ends, as viewed in FIG. 4, the headers 11 are equipped with connector fittings 39, 40, respectively, by which they are adapted to be connected, through the agency of studs 41 or the like, in communicating relationship to discharge and intake fittings (not shown) of the transformer 36 or other equipment. For the purpose of this connection, the headers 11, 12 are provided, at the end thereof adjacent the connector 39, with an annular, radially extending flange 42, this being a component of the unit as supplied to the user. A suitable filler fitting 43 may be provided on the upper header 11.

Figure 9:
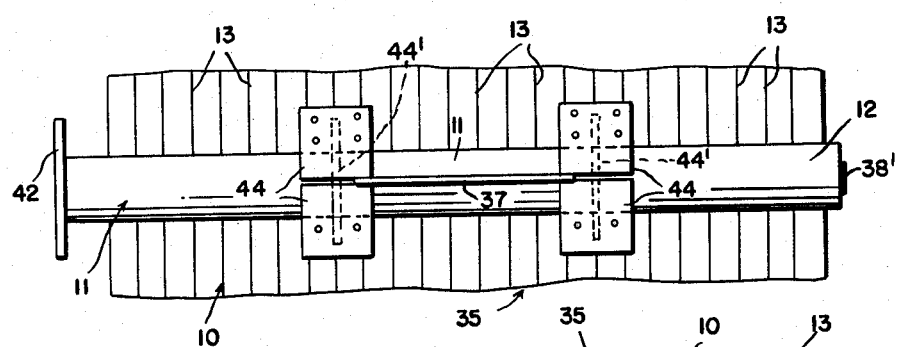
FIGS. 8 and 9 are schematic fragmentary views illustrating the manner in which units in accordance with the invention may be equipped to mount cooling fan means for installation on transformers having a forced air rating.
Figure 8:
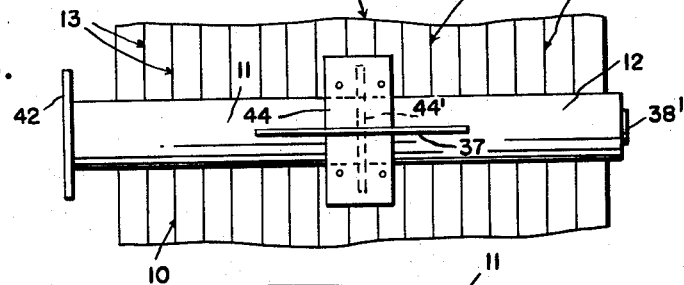

FIGS. 8 and 9 schematically show arrangements for mounting cooling fans to units installed on transformers rated for forced air draft. Thus appropriate fan mounting plates 44 equipped with transverse stiffener flanges 44' are provided, the flanges 44' being welded or otherwise fixedly secured to the header and the plates furnishing support on which one (FIG. 8) or two rows (FIG. 9) of cooling fans (not shown) may be bolted or otherwise fixedly secured. Thus means are provided by way of a transfer unit for a forced air transformer installation.

The invention affords a simple and inexpensive radiator or cooler which may be constructed in a very compact way in any desired heat radiating capacity. The thin construction of the plate-type heat transfer members 13 permits of a very large area of oil film surface, for a given, relatively small total volume within the plate members, thereby contributing to lightness of weight, as well as efficient heat transfer between the metal and oil. The close spacing of the plate members in their parallel longitudinal series makes for a very efficient stack action on air passing upwardly between the plates, being progressively heated in so passing, and in increasing in upward velocity. Heat is carried away from the outer flat surfaces of the plates in an increasingly efficient way until a condition of equilibrium is attained.

In regard to mechanical advantages attained by the welding to the headers 11, 12 of transition pieces 14 which are of lesser wall thickness, and by the same token, the welding of plate members 13 to the transition members or elements 14 which are of lesser wall thickness than the latter, an improved and stronger weld is made possible; and the progressingly diminishing wall thickness of the welded assembly affords a cushioned characteristic to dampen and absorb vibration. A flat, overall surface characteristic, with horizontal contours seam-welded and sealed eliminates the possibility of moisture accumulations and resultant possibility of rust deterioration.

Referring now to FIGS. 10 through 19 of the drawings, there is shown therein a second basic embodiment of the invention, an improvement over the form of FIGS. 1–9, in which plate assemblies, here generally designated by the reference numeral 46, are assembled and connected operatively to supply and return headers 47, 48, respectively in a different manner than the assembly of the embodiment of FIGS. 1 through 9, but nevertheless with the same effect of stabilizing and distributing strain at the weldments in an improved way. Insofar as operation is concerned, the same desirable features are obtained as in the earlier embodiment relative to the thinness of oil film, stack effect of a multiplicity of the plate assemblies 46 in close spacing relation to one another longitudinally of the headers 47, 48, high heat transfer rate due to a high internal area—volume ratio, thinness of material of construction, inherent light weight of the construction as a whole and improved surface contour to prevent moisture accumulation at joints.

Generally considered, the plate assemblies 46 are similar in structure to those designated 13 in the earlier embodiment, featuring like component, stamped sheet metal plates 49, each provided with one or more longitudinally extending embossments 50 along which the plates are seam-welded to one another when assembled in flatwise engagement in the manner shown in FIGS. 13–15. As seam-welded at 51 about the periphery thereof (other than at their arcuate zones of welded attachment to the respective headers 47, 48) the plates provide liquid flow passages 52 for coolant in the same manner as the first embodiment.

As illustrated in FIG. 15, it is desirable that the peripheral seam welding be brought out to the extreme ends of the outturned flanges 53 of plates 49; and the outer edges are rounded, for best adherence of paint to the external surface and best shedding of moisture in field use.

Structural features of the headers 47, 48 appear in FIGS. 12 and 19, from the latter of which it will be noted that the header, in a desired diameter and wall thickness or gauge, is milled, slotted or otherwise punched to provide arcuate and relatively wide openings 54 at which the header is assembled in nested engagement with the plate assembly 46. The outer end of each header is closed by a circular plug 55 peripherally secured within the end of the header, as by means of a leak-tight annular weld 56.

As in the embodiment of FIGS. 1 through 9, the sheet metal material of the plate stampings 49 is of substantially lesser gauge than the wall thickness of headers 47, 48. For the purpose of providing a satisfactory joint between the plate assemblies and headers, avoiding the normal problems encountered in affixing a light gauge stock to a heavier, and without resort to the use of transition piece arrangements as in the embodiment of FIGS. 1 through 9, the provisions best illustrated in FIGS. 13 through 18 are employed.

Thus, each plate 49 is stamped at its central top and bottom zones to provide an outwardly projecting arcuate embossment 58 of slightly less than semi-circular extent adjacent the intended arcuate zone of nesting welded engagement of the plate assembly with the header, this embossment being of a substantial radial width, in relation to its inner and outer diameters, and of transverse width adequate to span a header slot 54. In a typical installation its projects, say, ⅛ inch outwardly of the adjoining surface of the surface of plate 49, over and above the thickness of the plate material. Thus an intake mouth of substantial area is provided at which the plate assembly communicates with the header.

Furthermore, the plate 49 is shaped about the small radius periphery of the embossment 58 to provide an integral, outwardly extending lip or flange 59 of arcuate outline, being of somewhat less peripheral extent than the embossment 58. The embossments 58 and flanges 59 of the two like plates 49 of plate assembly 46 are identically located in relation to those plates, so as to be in transverse registry with one another in the direction normal to the flat plate surface. Outwardly of the embossment 58 and flange 59, the material of the plate 49 is stamped through the peripheral flange 53 to receive the header.

With the plate assembly 46 located in nested engagement with the header, in the manner best shown in FIG. 12, and with the flanges 59 outwardly spanning the arcuate slot 54 of the header, the welded connection of plate assembly to header is made about the outline of the flanges, as at 61. The efficiency of this welded connection is of great importance. Likewise, and as illustrated in FIG. 11, the peripheral weldment between plate flanges 53 is brought up to the header and outwardly about the flange joint 61.

The flanges 59 have stabilizing engagement over a substantial area with the respective headers 47, 48, the weld at the flanges or lips 59 extending all the way around the same and externally of the header openings 54 for a fluid tight joint. The effect of the embossment 58 is to stiffen the plate 49 in the manner of a rib formation, providing a collar of strength at the weldment, and to dampen and take away vibrational strain, such as may be involved in shipment or handling, away from the weld area. By using weld connections at flanges 59, the weld position is shifted a full 90° to the plane of the plate assembly and the weld joint is further shielded from the effect of vibration, thus also contributing to the elimination of weld fatigue and possibility of actual physical disruption at the joint.

FIG. 20 illustrates an alternative adaptation of the embodiment of FIGS. 10 through 19 for an installation in which the heat transfer unit is detachably or removably applicable to the transformer or like component to be serviced, as for shipment and filling with oil on location. Inasmuch as provisions for releasably connecting such unit to such component are of the same type as employed in the removable embodiment of the invention depicted in FIGS. 4 and 5 of the drawings, involving special fittings associated with an end flange of the assembled header and plate unit, parts and relationships of the removable adaptation of the second embodiment are designated by the same reference numerals employed in FIGS. 10 through 19, but primed, while connector provisions corresponding to those of FIGS. 4 and 5 are also designated by corresponding reference numerals, primed. In the adaptation of FIG. 20, a filler fitting for the upper header 47' is specially designated 61'. In other respects, the embodiment of this figure resembles that of FIGS. 10 through 19, being correspondingly constructed and having identically corresponding function and advantages, so that further description is unnecessary.

It will be appreciated that, in the second embodiment of the invention illustrated in FIGS. 10 through 20, the enlargement of the opening mouths of the plate members or assemblies 13 to the intake header 11 by the provision of the embossments at 58 provides for an increased and ample oil supply to the interior of the plate assembly.

This feature is carried over in augmented degree in the preferred third embodiment of the invention illustrated in FIGS. 21 through 25. Not only are the direct intake mouth area and volume increased at the header, but this effect is carried downwardly into the plate assemblies in the form of stepped manifold throats with which the mouths communicate. These throats, though of lesser internal width than at the mouths, are still of greater internal width than in the first two described embodiments of the invention, and the throats are of considerable vertical and horizontal extent. The resultant augmented manifold throat volume affords a very copious supply of coolant oil to the plate interior under a substantial hydraulic pressure head, which itself produces a substantial improvement in heat dissipation capacity over the form of FIGS. 10–20.

Coupled with this feature, we find that a rippling or corrugating of the intermediate vertical zone of the plate assembly results in a surprising increase in heat dissipative capacity of the multiple plate radiator as a whole, and an increase which has been found to substantially better any increase which may be produced individually and alone by an augmented surface area due to rippling or corrugating. However, in particular, the unexpected increase in efficiency appears to be attributable mainly to the action of the augmented throat volume at the stepped zone beneath the header mouth zone of the plates. Inasmuch as the invention of the preferred and third embodiment of the invention, as shown in FIGS. 21–25, is (other than in respect to the combination of enlarged mouth and throat and rippling or corrugating features just mentioned) closely similar to the embodiment of FIGS. 10–20, inclusive, in regard to the structural assembly of the component stamped plates, their attachment to the headers at laterally extending, arcuate lips or flanges spanning arcuate slots in the headers, and the like, the description as to FIGS. 21–25 need not be further enlarged and reference may be made to that relating to FIGS. 10–20 for information as to structure and advantages.

As shown in FIGS. 21 through 25, the individual plate assemblies are generally designated 64, being applied to upper intake and lower outlet headers 66, 67, respectively. These are removably attached by flanged fitting assemblies 68 to the wall of the electrical transformer 69 in the manner previously described. However, the improvement of FIGS. 21–25 also contemplates a permanent welded connection of the headers to the transformer.

As perhaps best illustrated in FIG. 24, the component stamped sheet metal plates 70, 71 of each plate member or assembly 64 are formed to provide the opposed, generally semi-circular, outwardly bulged embossments 72 directly adjoining the outwardly flared weld lips or flanges 73, in which the slotted surfaces of the headers 66, 67 are nested and welded, in the manner described in connection with FIGS. 10–20. This affords, in each plate assembly, a wide arcuate intake mouth 75 and (FIG. 23) an equally large discharge mouth 76 in direct communication, respectively, with enlarged communicating slots 77, 78 of headers 66, 67. Thus copious volume is provided for the entry and exit of the liquid coolant into and out of the plate assemblies 64. Directly adjoining the respective mouths 65, the plates 70, 71 are stamped to offset the same inwardly (or toward one another in the assembly) at 79, thus affording in the assembly further manifold throats 80, 81 substantially coextensive with, or at least extending across a major part of, the effective breadth of the plates between their side flanges 53, which throats are in communication with the respective intake and discharge mouths 75, 76. Since these arcuate mouths are of substantially greater width (about 50% greater) than those of the form of FIGS. 10–20, the throats 80, 81, though of lesser internal width across their walls than the mouths, are still of much greater breadth than the latter in the direction from side-to-side of the plate assembly 64, hence of much greater volumetric capacity than is possible in a plain, flat walled plate construction, being of substantial vertical extent and substantially or in a major part coextensive horizontally with the effective breadth of the plate assembly, as appears in FIGS. 21 and 22. Here again, the invention affords a very copious initial supply of coolant oil to the interior of the plate assemblies, and diminished resistance to flow therein under a substantial hydraulic pressure head, which are believed to be controlling factors contributing to the improved heat dissipative capacity of the embodiments of FIGS. 21–25 to be referred to.

In a transverse, horizontal extending zone, generally designated 82 (FIG. 22), between the throats it has further been found desirable to form the plates 70, 71 by stamping the later across the breadth thereof between flanges 53, or a major part thereof, in a rippled or corrugated pattern 83 which best appears in FIGS. 22 and 25. Thus there are provided corrugated passage zones 84 of increased internal and external surface areas at the intermediate zone 82. The effect of such increased corrugating is to increase convective heat transfer; however, it is believed that the phenomenon producing the greatly increase heat dissipation is primarily one of increased intake volume at the intake mouth and throat and velocity of flow between headers, with corresponding increased "U" values and higher heat transfer rate.

If desired, and for improved rigidity, the rippled or corrugated zone 82 may be subdivided into two or more sections by fully indenting the plates 70, 71 at one or more vertically extending sub-zones 86, so that in such zone or zones the plates may have abutting engagement with one another and may, if desired, be welded together.

Although in plate assemblies, vertical and horizontal dimensions and spacing of the plates will of course vary in accordance with specification requirements, if it is assumed that the internal surface width "A" (FIG. 24) between plates 70, 71 at the bases of the corrugations 83 amounts to say, ¼" nominal, then the offsetting outwardly of each plate at the throat zones 80, 81 will amount to, say, ⅛" at "B" from the internal corrugation surface mentioned to the internal surface at the offset 79. This signifies a total internal width at the throat zones 80, 81 amounting to a nominal ½".

Similarly, an outward offset "C" (FIG. 24) at the mouth embossments 72 may typically amount to an additional ⅛", signifying that the overall internal width at the respective mouths 75, 76 will be a nominal ¾"; and the width of the slots 77, 78 in the respective headers 66, 67 may be correspondingly increased to this last-mentioned dimension. The results of the above described combination of plate forming operations are of great interest.

For example, it has been found by actual construction and test that if a series of plate assemblies are provided solely with a transverse intermediate ripple zone, corresponding to the zone 82, even to the extent of increasing surface area in this zone by 7% due to the ripple configuration, but lacking the enlarged stepped formations at 79 producing the increased volume manifold throats 80, 81, the result in regard to an increased total heat dissipation, as compared with the construction shown in FIGS. 10 through 20, is negligible.

However, it was found that in a tested plate member having only the manifold throat stepping at 79 and lacking the rippling or corrugating at zone 82, an increase of approximately 7% in total heat dissipation capacity resulted, as compared with a unit lacking both the throat stepping and rippling, the increase being obviously solely due to the stepping, external surface area remaining about the same as a more standard unit like that of FIGS. 10–20. Moreover, in a tested unit combining, in addition to the enlarged mouth feature 75, both the enlarged manifold throat feature 80 and the ripple zone feature 82, the observed total heat dissipation improved by 15%.

Thus, it is to be reasonably concluded that an ample enlargement at the throat zone itself and alone contributes greatly (in the order of 7%) to an increase in heat transfer efficiency of substantial amount, and whereas the result of simple rippling alone is a negligible contribution in this respect, the combination of the features produces a heat dissipation increase up to approximately 15%.

Thus, these features inter-contribute in a surprising manner; and it appears that they produce a balance of factors of volume of oil supply to the plate assembly 64, surface area of the latter, oil film at the meeting area of coolant and plate surface at which the oil actually "sees" the plate, and air film, to which the observed improved efficiency is to be attributed. That is, the increment of width represented by this minute film, nevertheless, constitutes a substantially greater percentage of the overall width of the column of coolant traversing the heat exchange member than it would be if the latter were of uniform wall-to-wall width throughout its vertical extent.

Further, the relatively thin plates may be assembled in very close successive spacing along the length of the header, thus improving the convective stack effect and a more efficient metal to air transfer. Yet the gradual necking down of the width of each heat transfer member through its mouth zone, its throat zone and its ripple zone tends to diminish substantially the expected diminution of efficiency due to inter-radiation between the plates.

Naturally, the total area and volume occupied by the assembly of headers and heat transfer members is reduced to a minimum, which is always an important practical and theoretical consideration.

It is possible that, coupled with the increased volume of oil furnished to the interior at the enlarged manifold throat, i.e., a high pressure head to carry oil through the plate assembly, that a venturi action at the point of communication of upper throat 80 with the rippled or corrugated section 82 produces an accelerated flow of the coolant through the radiator unit, with an increased rate of heat transfer at the oil film. It is possible that this effect is desiredly enhanced further by a sub-channeled flow through the corrugated or rippled interior 84 of the intermediate zone 82. It is difficult to assess the degree to which individual structural features contribute, but it is undeniable that they do so in a way not heretofore observed in the art.

In other respects, the embodiment of FIGS. 21-25, inclusive, has all of the advantages of that of FIGS. 10-20. As to rigidity, there is a sturdy collar of strength joint between header and plate assembly 64 which is leak-proof and strongly resists displacement under shock or weakening due to weld fatigue. Plate assemblies 64 having the observed attributes of thermal transfer efficiency may be spaced as closely relative to one another along the length of the headers 66, 67 as is possible to balance a desirably small occupied space with efficient radiative and convective capacity without undesirable interchange. The rippling or corrugating of the plates gives a desirable ratio of oil film area to volume of oil; and in other respects the assembly 64 has advantages discussed in connection with the corresponding plate assembly 46 of the embodiment of FIGS. 10 through 20.

While overall external height and breadth dimensions of the plate assembly 64 will obviously vary widely in accordance with the intended size and flow capacity of different installations, it may be considered that, for an assembly as described above having the instanced internal wall-to-wall widths at mouth 75, throat 80 and rippled zone 84, for an overall horizontal plate breadth of about 9 inches and an overall height of about 28 inches, the vertical depth of the throat 80 between the mouth and rippling might, for example, amount to about 4 inches. As indicated above, it is substantially coextensive in breadth with, or extends a major part of, the effective breadth of the plate.

To repeat, the dimensioning may differ in different specific designs, but the expressed relations are typical of the order of size of a throat 80 of the stated width which has been found successful for the kind of results described above.

What we claim as our invention is:

1. A heat transfer unit comprising a pair of elongated parallel, vertically spaced headers having arcuate slots formed therein in vertically aligned and facing relation to one another, and a hollow vertically extending heat transfer member of substantial height and horizontal breadth disposed between said headers and in communication with said respective slots at upper and lower ends of the transfer member, said transfer member comprising a pair of sheet metal plates marginally sealed to one another and specially shaped to provide generally parallel, upright liquid flow containing walls, said walls being formed to provide at least one liquid flow zone horizontally of the transfer member and intermediate the top and bottom of the latter which is provided with corrugations extending toward the respective headers, said plate walls having a predetermined minimum spacing from one another at said zone, said walls above and below said zone being in a relatively wide spacing from one another substantially exceeding said minimum spacing thereof at said corrugated zone to provide manifold throats substantially coextensive in horizontal breadth with at least a major part of the breadth of the transfer member and of substantial height above and below said corrugated zone and communicating vertically with the latter, said plate walls being formed above and below the respective throats in a greater spacing from one another than at said throats to provide relatively wide mouths of less horizontal breadth than the throats, which mouths span the slots of the respective headers to communicate said transfer member with said headers, the transfer member being connected to said headers adjacent the respective mouths.

2. A heat transfer unit in accordance with claim 1, in which said mouths of said transfer member are each provided with integral, arcuate flange formations projecting laterally outwardly of the respective plate walls and nestingly engaging the respective headers on opposite sides of the slots thereof, at which flanges the transfer member has a liquid-tight connection to said headers.

References Cited in the file of this patent

UNITED STATES PATENTS

| | | |
|---|---|---|
| 1,368,770 | True | Feb. 15, 1921 |
| 2,464,473 | Wessel | Mar. 15, 1949 |
| 2,620,169 | Gross et al. | Dec. 2, 1952 |

FOREIGN PATENTS

| | | |
|---|---|---|
| 105,878 | Germany | Oct. 1, 1898 |
| 122,393 | Germany | July 12, 1901 |
| 240,525 | Switzerland | May 16, 1946 |
| 732,477 | Germany | Mar. 3, 1943 |
| 967,955 | France | Apr. 5, 1950 |